(12) United States Patent
Markanday et al.

(10) Patent No.: US 11,680,426 B2
(45) Date of Patent: Jun. 20, 2023

(54) LOCKING MECHANISM FOR A MOTOR

(71) Applicant: FORD GLOBAL TECHNOLOGIES, LLC, Dearborn, MI (US)

(72) Inventors: Vikas Markanday, Mill Pond (AU); Bala Sridhar, Craigieburn (AU); Daniel Antoniades, Campbellfield (AU); Ryan Rawnsley, Rayong (TH)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 611 days.

(21) Appl. No.: 16/788,559

(22) Filed: Feb. 12, 2020

(65) Prior Publication Data

US 2020/0291681 A1    Sep. 17, 2020

(30) Foreign Application Priority Data

Mar. 12, 2019   (CN) .......................... 201910183438.0

(51) Int. Cl.
   *E05B 47/02*   (2006.01)
   *E05B 47/06*   (2006.01)
   (Continued)

(52) U.S. Cl.
   CPC ............ *E05B 47/026* (2013.01); *B60R 25/02* (2013.01); *B60R 25/02126* (2013.01);
   (Continued)

(58) Field of Classification Search
   CPC .... E05B 47/0004; E05B 47/02; E05B 47/026; E05B 47/06; E05B 47/0603;
   (Continued)

(56) References Cited

U.S. PATENT DOCUMENTS 6,539,756 B2 *   4/2003   Bartels ............. B60R 25/02153
                                                                 70/252
6,810,700 B2 *   11/2004  Okuno ............. B60R 25/02126
                                                                 70/252
(Continued)

FOREIGN PATENT DOCUMENTS

IN   201741013529 A        4/2017
KR   20200039273 A *       4/2020   ............ B62D 5/006
(Continued)

OTHER PUBLICATIONS

Mummert M., Hacked Lock with Solenoid—YouTube; Jul. 27, 2018; https://www.youtube.com/watch?v=OoAiaJkyPI.

*Primary Examiner* — Christopher J Boswell
(74) *Attorney, Agent, or Firm* — Vichit Chea; Carlson, Gaskey & Olds, P.C.

(57) ABSTRACT

A locking mechanism for a motor is provided. The locking mechanism includes a detent mounted on a shaft coupled to the motor, and a solenoid including an electromagnetic coil, a plunger, and a spring that holds the plunger at an extended state. The plunger engages the detent at the extended state when no voltage is applied, and the spring is configured to exert a predetermined force for the plunger to engage the detent to lock the shaft. The plunger retracts away from the detent to allow rotation of the motor shaft when a voltage is applied to the solenoid.

13 Claims, 10 Drawing Sheets

(51) Int. Cl.
  *B60R 25/02* (2013.01)
  *E05B 47/00* (2006.01)
  *F16H 63/36* (2006.01)
  *F16H 55/17* (2006.01)
  *B60R 25/021* (2013.01)
  *B60R 25/0215* (2013.01)
  *E05B 65/00* (2006.01)
  *B60R 25/01* (2013.01)

(52) U.S. Cl.
  CPC .... *B60R 25/02156* (2013.01); *E05B 47/0004* (2013.01); *E05B 47/0673* (2013.01); *E05B 65/0021* (2013.01); *F16H 55/17* (2013.01); *F16H 63/36* (2013.01); *B60R 25/01* (2013.01)

(58) Field of Classification Search
  CPC ............ E05B 47/0657; E05B 47/0665; E05B 47/0673; E05B 65/0021; B60R 25/002; B60R 25/02; B60R 25/0211; B60R 25/02126; B60R 25/0215; B60R 25/02156; F16H 55/17; F16H 63/36
  See application file for complete search history.

(56) References Cited

U.S. PATENT DOCUMENTS

| | | | |
|---|---|---|---|
| 6,862,907 B2 * | 3/2005 | Hayashi | B60R 25/02142 70/182 |
| 7,327,050 B2 * | 2/2008 | Koga | B60R 25/02156 307/10.6 |
| 9,827,949 B2 * | 11/2017 | Sugimoto | B60R 25/0215 |
| 10,759,382 B2 * | 9/2020 | Huang | B60R 25/02153 |
| 11,338,847 B2 * | 5/2022 | Yeom | B60R 25/0215 |
| 2003/0127274 A1 * | 7/2003 | Dominke | B60R 25/0211 180/402 |
| 2003/0146037 A1 * | 8/2003 | Menjak | B62D 5/006 180/402 |
| 2011/0278140 A1 | 11/2011 | Kakizaki | |
| 2011/0291846 A1 | 12/2011 | Burdenko | |
| 2015/0184700 A1 | 7/2015 | Balsiger | |
| 2015/0375772 A1 * | 12/2015 | Ulrich | B62D 5/001 74/495 |
| 2020/0108860 A1 * | 4/2020 | Yeom | B62D 5/0463 |
| 2021/0094507 A1 * | 4/2021 | Turek | B60R 25/0211 |

FOREIGN PATENT DOCUMENTS

| | | | | |
|---|---|---|---|---|
| KR | 102110313 | B1 * | 5/2020 | ........ B62D 5/0472 |
| WO | 2017182502 | A1 | 10/2017 | |

* cited by examiner

LOCKING MECHANISM FOR A MOTOR

CROSS-REFERENCE TO RELATED APPLICATIONS

This disclosure claims priority to Chinese Patent Application No. 2019101834380, which was filed on Mar. 12, 2019 and is incorporated herein by reference in its entirety.

FIELD

The present disclosure relates to a locking mechanism for a motor and, in particular, to a locking mechanism in a drive assembly that positively locks the motor.

BACKGROUND

An electric motor is widely used as a drive unit to drive an accessory in various fields such as vehicles, home appliances and so on. For example, in a vehicle, an electric motor is used as a drive unit for moving power windows, windscreen wipers, seats, cargo roller shutter. The drive unit generally includes a motor having an output shaft and a geared and/or non-geared power transmitting mechanism. The power transmitting mechanism connects the output shaft of the motor with the accessory and transfers the power and/or motion from the motor to the accessory.

In one example, a drive unit is used in a powered cargo roller shutter of a truck to move the cargo roller shutter between an open position and a closed position. When the cargo roller shutter is fully closed and no electrical power is applied, the roller shutter may be opened by applying a sufficient external force on the cargo roller shutter. Locking the drive unit shall prevent undesired opening of the cargo roller shutter. However, the conventional approaches for locking the drive unit compromises on the efficiency of the drive unit. For example, in a motor having a worm drive gear as a power-transmitting mechanism, a lead angle between gears is reduced to achieve a higher motor locking torque and prevent undesired opening of the cargo roller shutter by the external force. However, a small lead angle leads to higher friction between gears, resulting in significant drop in transmission efficiency, higher current draw by the motor, higher noise level and lower system reliability. Therefore, the need to provide a locking mechanism to lock the motor positively has been recognized.

SUMMARY

According to one aspect of the present disclosure, a locking mechanism for a motor is provided. The locking mechanism includes a detent mounted on a shaft rotatably coupled to the motor, and a solenoid including an electromagnetic coil, a plunger, and a spring that holds the plunger at an extended state. The plunger engages the detent at the extended state when no voltage is applied, and the spring is configured to exert a predetermined force for the plunger to engage the detent to lock the shaft. The plunger retracts away from the detent to allow rotation of the motor shaft when a voltage is applied to the solenoid.

In one embodiment, the solenoid is positioned such that a moving direction of the plunger is substantially perpendicular to a lengthwise direction of the motor shaft.

In another embodiment, the solenoid may be positioned such that a moving direction of the plunger is substantially parallel to a lengthwise direction of the motor shaft.

In another embodiment, the motor may be a geared motor and includes a worm wheel and worm screws formed on the motor shaft.

In another embodiment, the shaft may be an output shaft of a geared drive.

In another embodiment, the motor may be a non-geared motor.

In another embodiment, the shaft may be the motor shaft, and the locking mechanism may further include a plunger sensor and a control module. The solenoid may further include a position ring having a protrusion extending at a radial direction and disposed on a free end of the spring. The plunger sensor may detect a position of the protrusion and output a detected position to a motor control module adapted to receive a signal from the plunger sensor and send out information on a state of the plunger.

According to another aspect, a drive assembly is provided. The drive assembly includes a detent mounted on a motor shaft, and a solenoid including an electromagnetic coil, a plunger, and a spring that holds the plunger at an extended state. The plunger engages the detent at the extended state when no voltage is applied. The spring is configured to exert a predetermined force for the plunger to engage the detent such that the motor shaft is locked and not moveable under an external force on the roller shutter. The plunger retracts away from the detent to be at an extracted state such that the motor shaft is moveable when a voltage is applied to the solenoid.

In one embodiment, the detent may be mounted on the motor shaft adjacent to an engagement position of the motor shaft with an output gear, and the detent may be positioned between a motor body and the engagement position, and a moving direction of the plunger is substantially perpendicular to a lengthwise direction of the motor shaft.

In another embodiment, the motor shaft may include a first portion extending from a first side of the motor and a second portion extending from a second side of the motor opposite the first side. The detent may be mounted at the second portion of the motor shaft, and a motor body is disposed between an engagement position of the motor shaft with an output gear and the detent. A moving direction of the plunger is substantially perpendicular to a lengthwise direction of the motor shaft.

In another embodiment, the detent may be mounted on a free end of the motor shaft, the free end may have a recess configured to receive the detent when the plunger is at the extended state. A moving direction of the plunger is substantially parallel to a lengthwise direction of the motor shaft.

In another embodiment, the detent may include a plurality of teeth, and the plunger may latch into one space between two teeth when no voltage is applied on the solenoid.

In another embodiment, the drive assembly may further comprise a motor position sensor to detect an operation status of the motor and a motor control module. The motor control module may be configured to command the plunger to move to the extended state upon a user command and a signal from the motor position sensor that the motor stops running.

In another embodiment, the drive assembly may further comprise a plunger sensor to detect a state of the plunger and a notification device. The solenoid may further include a position ring having a protrusion extending at a radial direction and disposed on a free end of the spring, and the plunger sensor detects the state of the plunger based on a position of the protrusion. The motor control module may send out a signal to the notification device when the plunger sensor detects that the plunger is at the extracted state when the voltage is cut off.

According to yet another aspect, a drive assembly of a powered cargo roller shutter of a vehicle is provided. The drive assembly includes a motor having a motor shaft and a motor body, an output gear coupled to the motor shaft, a detent mounted on the motor shaft, and a solenoid positioned adjacent to the detent. The output gear drives the cargo roller shutter as the motor shaft rotates. The solenoid includes an electromagnetic coil, a plunger, and a spring. The plunger is biased by the spring at an extended state and engages the detent to lock the motor shaft when there is no voltage applied to the electromagnetic coil, and the spring is configured to exert a predetermined force such that the motor shaft is locked to resist an external force exerted on the roller shutter once the plunger is engaged with the detent. The plunger moves away from the motor shaft to be at an extracted position to allow rotation of the motor shaft when a voltage is applied to the solenoid.

In one embodiment, the detent may include a plurality of teeth, and the plunger latches into one space between two teeth when no voltage is applied on the solenoid.

In another embodiment, the output gear may be a worm wheel, and the motor shaft may include worm screws engaged with the worm wheel, and the detent may be disposed between the worm wheel and the motor body of the motor.

In another embodiment, the drive assembly may further include a motor control module and an actuator adapted to communicate with the motor control module. The motor control module may command applying a voltage to the solenoid to retract the plunger to the extracted state when the actuator is at an "on" status, and the motor control module commands cutting off the voltage to the solenoid to extend the plunger to lock the motor shaft when the actuator is at an "off" status. The actuator may be positioned on an instrument panel.

In another embodiment, the drive assembly may further comprise a motor position sensor to detect a status of the motor. The motor control module may be configured to command cutting off of the voltage to the solenoid to move the plunger to the extended state when the actuator is at an "off" status and the motor position sensor detects that the motor is fully stopped.

In another embodiment, the drive assembly may further comprise a plunger sensor and a notification device. The solenoid may further include a position ring disposed adjacent to the free end of the spring, and the position ring may include a protrusion at a radial direction. The plunger sensor is configured to detect a position of the protrusion, and the motor control module sends a signal to the notification device alerting an unlocking status of the cargo roller shutter when the actuator is at the "off" status and the plunger sensor detects the protrusion at the extracted position.

The locking mechanism for a motor of the present disclosure employs a solenoid actuated plunger that engages with a detent on the motor shaft when no voltage is applied, thereby the motor and thus the accessary driven by the motor are locked robustly. For the geared motor, with the positively locking, a lead angle of the gears can be designed higher to achieve higher gear efficiency.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed locking mechanisms for a motor will become better understood through review of the following detailed description in conjunction with the figures. The detailed description and figures provide merely examples of the various disclosures described herein. The person skilled in the art will understand that the disclosed examples may be varied, modified, and altered without departing from the scope of the disclosure described herein. Many variations are contemplated for different applications and design considerations; however, for the sake of brevity, each and every contemplated variation is not individually described in the following detailed description.

Throughout the following detailed description, examples of various locking mechanisms are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1A:
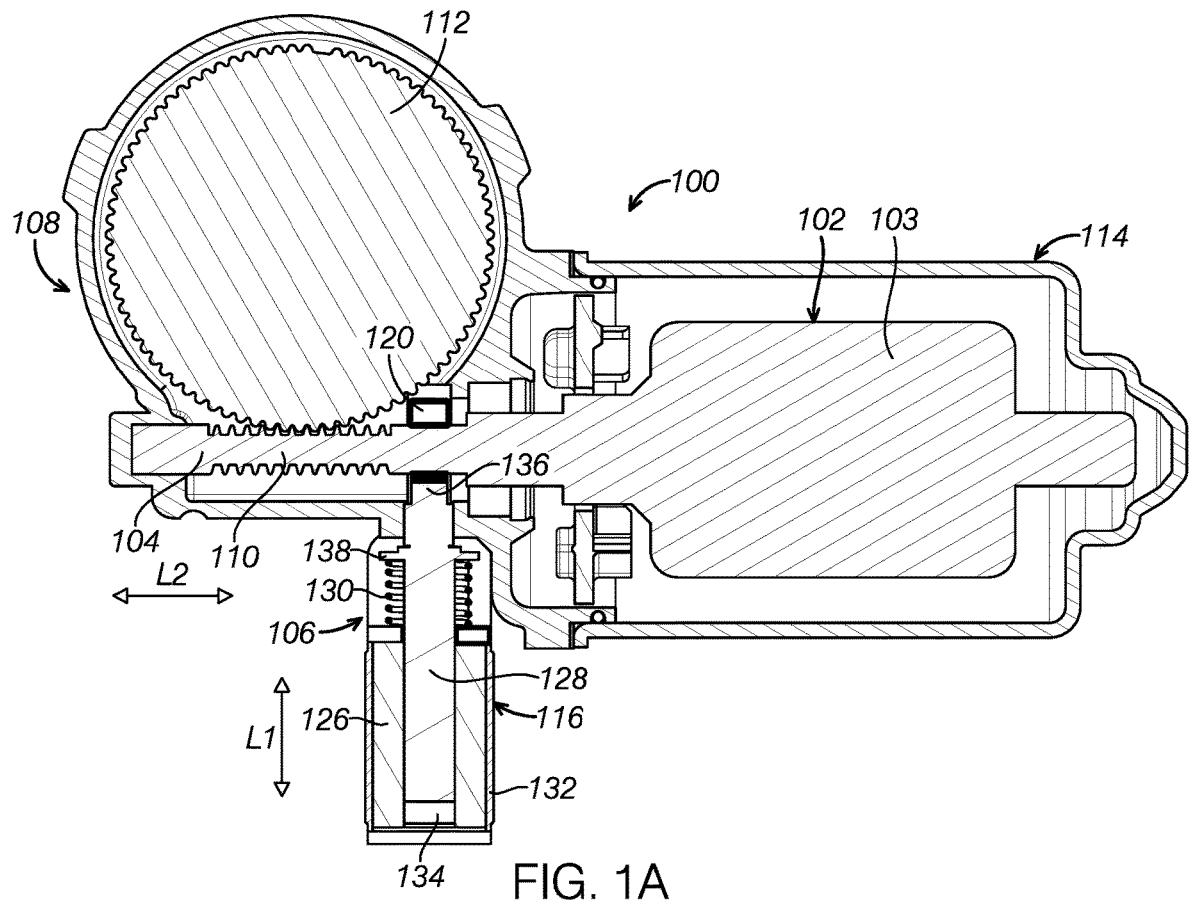
FIG. 1A illustrates a drive assembly according to an embodiment of the present disclosure, illustrating a plunger at an extended state.

FIG. 1A illustrates a drive assembly 100 according to an embodiment of the present disclosure. In some embodiments, the drive assembly 100 includes a motor 102 having a motor shaft 104 and a locking mechanism 106. The motor 102 may comprise a motor body 103 that includes a rotor and a stator. In the depicted embodiment, the motor 102 is a geared motor. It should be appreciated that the motor may be any appropriate motors such as a geared or non-geared motor, any types of an alternating current (AC) powered motor, a direct current (DC) powered motor, such as a brushed motor, a brushless motor, a synchronous motor or other motor types including but not limited to a stepper motor, reluctance motor, hysteresis, etc. The locking mechanism 106 may be used to lock any type of motor which produces mechanical energy or rotation on application of electrical energy.

The motor drive assembly 100 may include a gear device 108 to transfer a rotational force of the motor 102 to drive an accessory (not shown). In some embodiments, the gear device 108 may include a worm screw 110 and an output gear 112. In the depicted embodiment, the output gear 112 is a worm wheel. The worm screw 110 is formed on the motor shaft 104. The worm screw 110 meshes with the worm wheel 112 coupled to the accessory to transfer the rotational force of the motor 102 to the accessory. The motor 102, the motor shaft 104, and the gear device 108 may be accommodated in a housing 114. In other embodiments, the gear device 108 may include other types of gears such as bevel, helical, hypoid, spur gears, or other gear trains.

Figure 3:
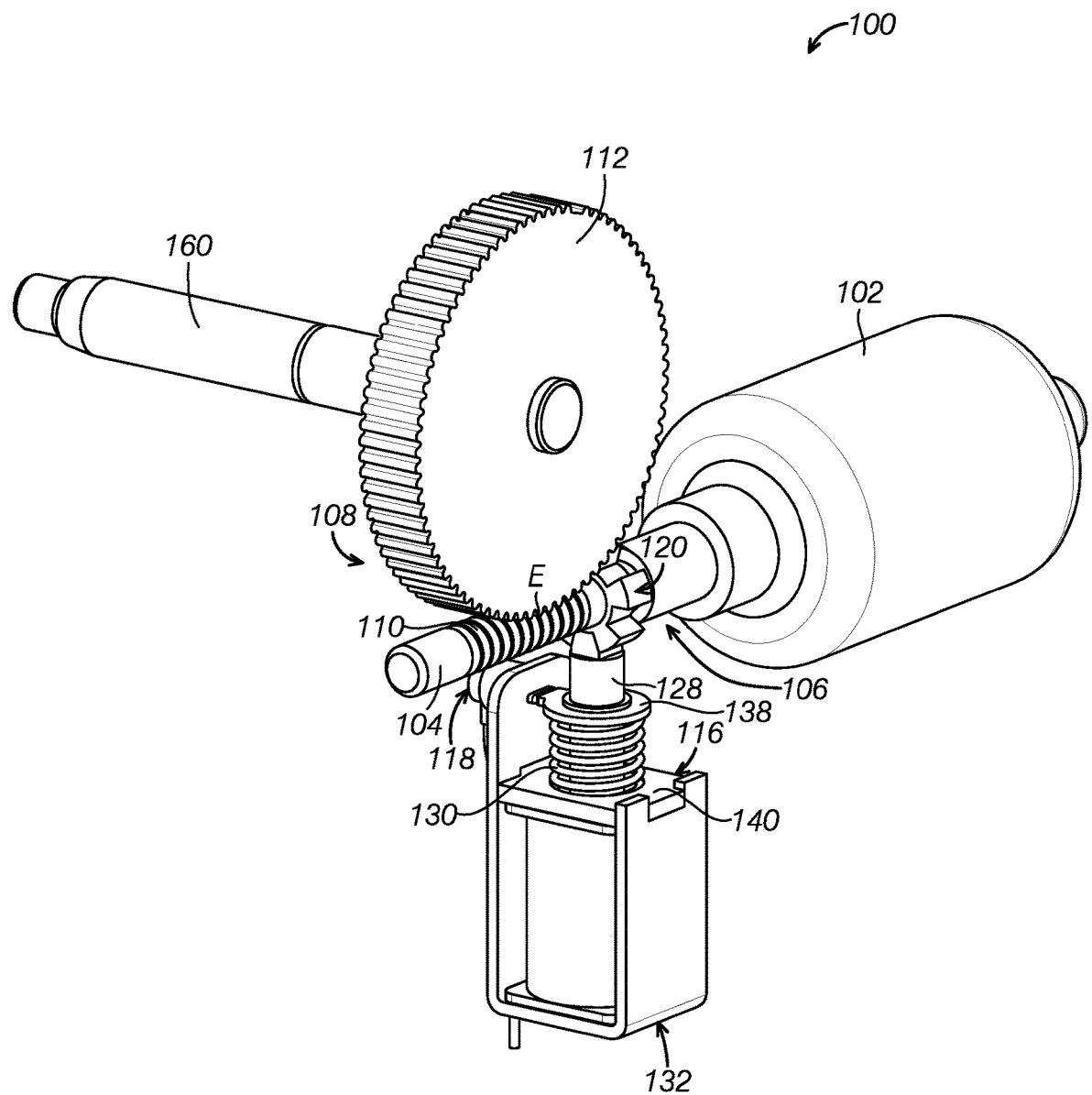
FIG. 3 is a partial perspective view of the drive assembly of FIG. 1A.
Figure 4:
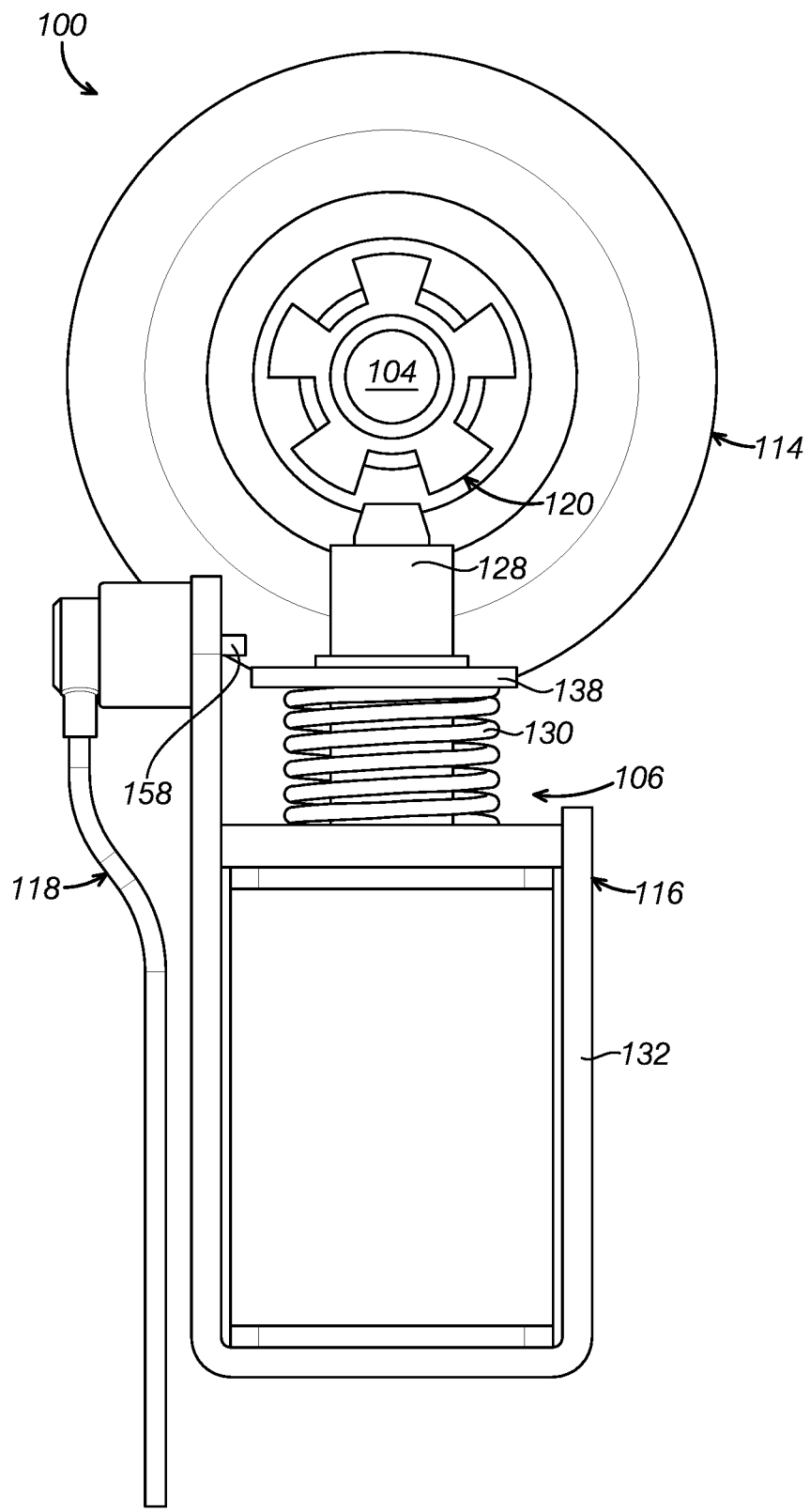
FIG. 4 is a side view of the drive assembly of FIG. 1A, illustrating a plunger at an extracted state.
Figure 5:
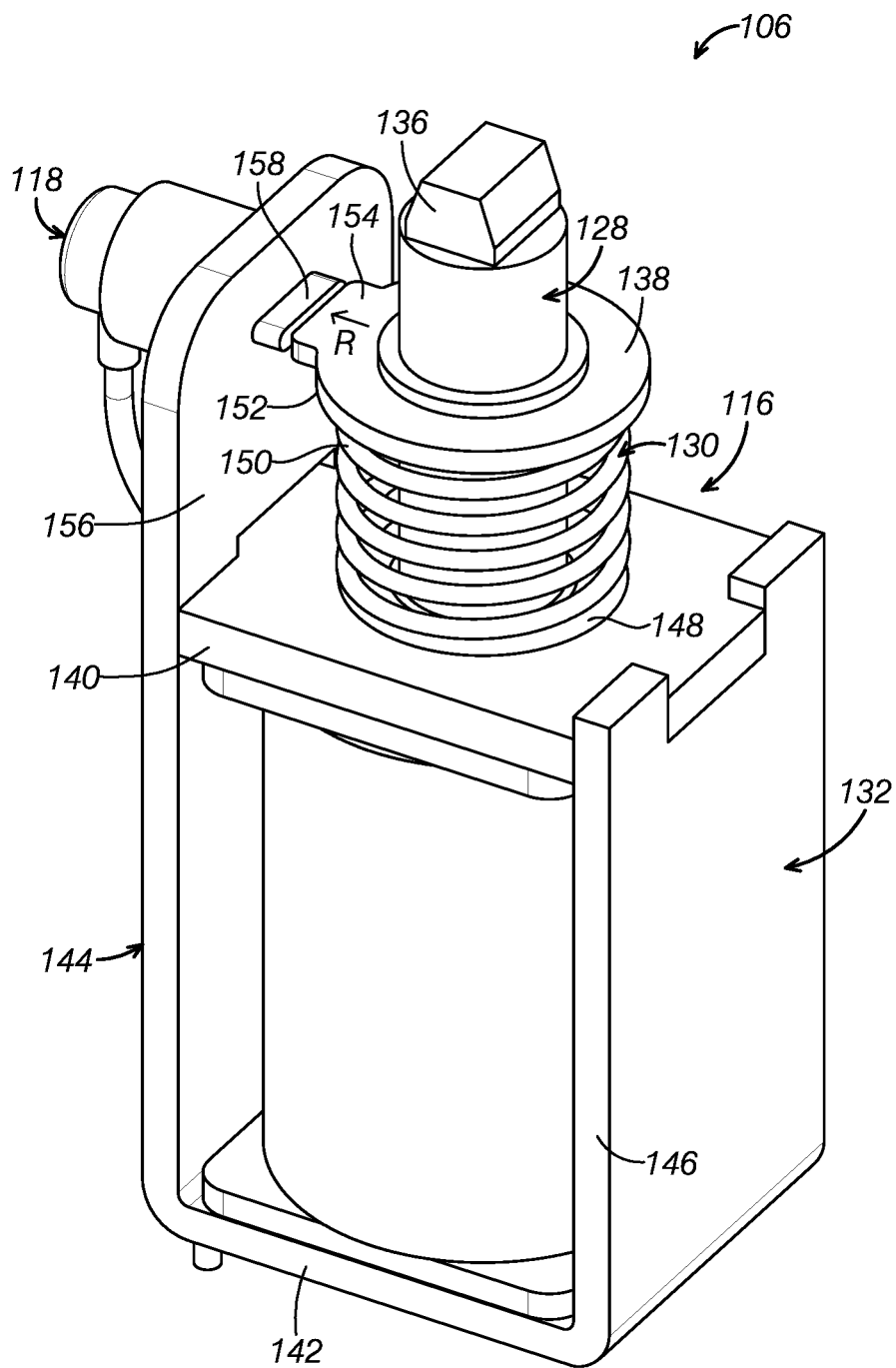
FIG. 5 is a perspective view of a solenoid and a sensor used in the drive assembly of FIG. 1A.

Referring to FIGS. 2-5, FIG. 2 is a sectional view of the drive assembly 100 of FIG. 1A. FIG. 3 is a partial perspective view of the drive assembly 100 of FIG. 1A. FIG. 4 is a side view of the drive assembly 100 of FIG. 1A. FIG. 5 is a perspective view of a solenoid 116 and a plunger sensor 118 of the drive assembly 100 shown in FIG. 1A. The locking mechanism 106 includes a detent 120 and the solenoid 116. The detent 120 may be mounted on a shaft that is coupled to the motor 102. Coupling of the shaft with the motor may mean that the shaft is directly coupled to the motor 102 or is indirectly connected to the motor 102. In the depicted embodiment, the shaft is the motor shaft 104 and the detent 120 is mounted on the motor shaft 104 and the solenoid 116. The detent 120 includes a locking groove 122. In some embodiments, the detent 120 includes a plurality of teeth 124 disposed at a predetermined distance along a circumference of the motor shaft 104. In some embodiments, the detent 120 may be a separate component mounted on the motor shaft 104 via a fastener. In some embodiments, the detent 120 may be integrally formed on the motor shaft 104. In some embodiments, the detent 120 may be mounted on the motor shaft 104 at a position adjacent to an engagement position E of the motor shaft 104 with the gear. For example, the detent 120 is mounted on the motor shaft 104 at a position adjacent to the engagement position E at which the worm screw 110 of the motor shaft 104 meshes with the output gear 112 as shown in FIG. 1A and FIG. 3. It should be appreciated that the detent 120 may have any appropriate configuration to mesh with a plunger 128 of the solenoid 116. For example, the detent 120 may be a pin extending from the motor shaft at a radial direction, and the contact between the pin and the plunger 128 prevents the movement of the motor shaft.

It should be appreciated that the detent 120 may be mounted on any appropriate part of the drive assembly 100 that can lock the motor 102 via the solenoid 116. For example, referring to FIG. 3, the detent 120 may alternatively be mounted on an output shaft 160 of a gear device 108.

The solenoid 116 includes an electromagnetic coil 126, the plunger 128, and a spring 130 surrounding the plunger 128. The plunger 128 of the solenoid 116 is positioned adjacent to the detent 120 and is configured to engage and disengage with the detent 120. The electromagnetic coil 126 is disposed in a casing 132 and surrounds the plunger 128. The spring 130 may be disposed outside the casing 132 and surrounds the plunger 128. The spring 130 may be configured to hold or bias the plunger 128 at an extended state as shown in FIGS. 1A, 2-3 and 5. That is, the spring 130 is configured to exert a predetermined force for the plunger to engage the detent 120 to lock the motor shaft 104. When no voltage is applied to the solenoid 116, the plunger 128 engages with the detent 120 and is positioned at the extended state. Upon application of a voltage to the solenoid 116, the electric current in the electromagnetic coil 126 is converted to magnetic field, which moves the plunger 128 to an extracted state such that the plunger 128 disengages with and away from the detent 120 to allow the free rotation of the motor shaft 104 as shown in FIG. 4. The voltage may be configured to generate an electromagnetic force greater than the force that holds the plunger 128 at the extended state. In some embodiments, a user command may be provided to initiate the application of voltage to the solenoid 116. In one example, the user command may be implemented via an actuator. In another example, the locking mechanism 106 may include a motor control module that initiates the application of voltage to the solenoid 116 to activate the motor 102 upon receiving the user command.

In the depicted embodiment in FIGS. 1A-6, a moving direction L1 of the plunger is substantially perpendicular to a lengthwise direction L2 of the motor shaft 104.

In some embodiments, the plunger 128 may be disposed at least partially inside the electromagnetic coil 126 and is configured to be moveable between the extended state at which the plunger 128 engages with the detent 120 and the retracted state at which the plunger 128 is spaced away from the detent 120. The plunger 128 may be an elongated body having a first end 134 disposed inside the electromagnetic coil 126 and a second end 136 disposed outside the electromagnetic coil 126 and facing the detent 120. The second end 136 may include a profile that compliments a shape of the locking groove 122 or a space between the adjacent teeth 124 of the detent 120 such that the plunger 128 latches into the locking groove 122 at the extended state. In some embodiments, the plunger 128 may include a position ring 138, and the spring 130 is positioned between a top wall 140 of the casing 132 and the position ring 138 to hold the plunger 128 at the extended state. In an embodiment, the spring 130 is a compression spring.

Figure 1B:
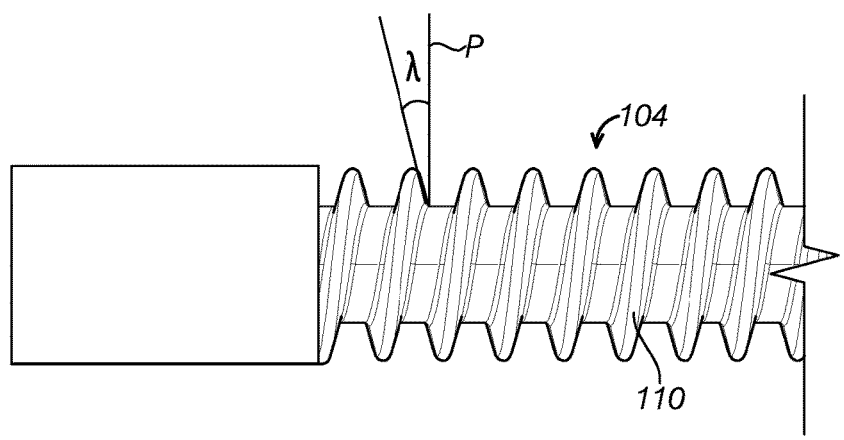
FIG. 1B illustrates a lead angle in a worm screw of the drive assembly of FIG. 1A.
Figure 2:
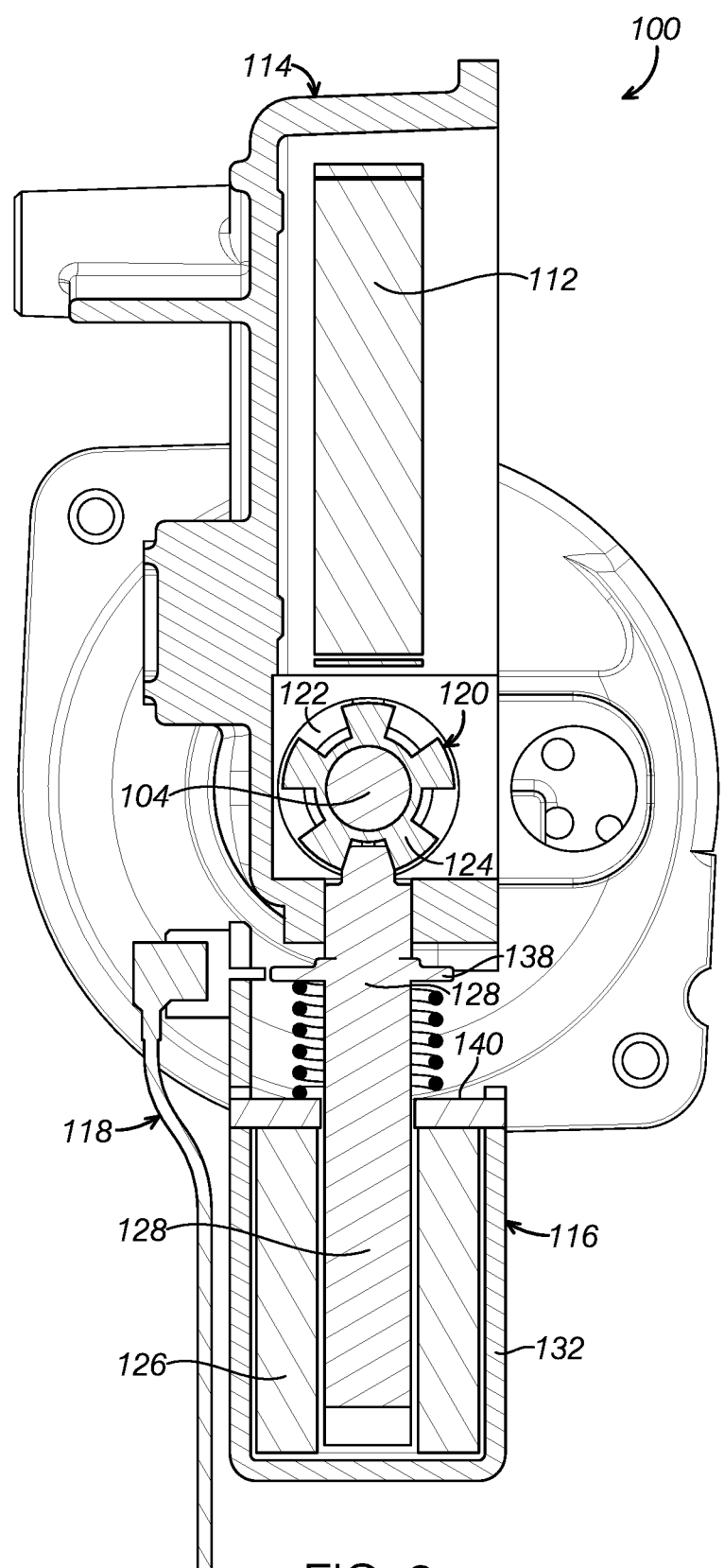
FIG. 2 is a sectional view of the drive assembly of FIG. 1A.

FIG. 1B is a partial cross-sectional view of the motor shaft 104, illustrating a lead angle $\lambda$ of the worm screws 110 of the gear device 108 in the drive assembly 100. As shown in FIGS. 1A and 3, when the plunger 128 is engaged with the detent 120, the motor shaft 104 is locked and cannot be rotated. That is, the positive locking mechanism is employed. Compared to the locking via the locking torque generated due to a lower lead angle of the gear, the positive locking allows the gear device 108 such as the worm screw 110 and the worm wheel 112 to have a greater lead angle $\lambda$. FIG. 1B illustrates the lead angle $\lambda$ of the worm screw 110 of the gear device 108. The lead angle $\lambda$ is the angle between the helix and a plane P substantially perpendicular to the motor shaft 104. The strength of the self-locking of the gear device 108 increases when the lead angle λ decreases. However, the smaller lead angle λ results in reduced transmission efficiency, higher current draw by motor, higher noise level and reduces the system reliability. The positive locking mechanism of the present disclosure enables the design of the gear device 108 with a smaller lead angle while achieving desired gear efficiency.

Referring to FIG. 5, in some embodiments, the solenoid 116 may include the casing 132 for accommodating the electromagnetic coil 126. The casing 132 includes a bottom wall 142, a top wall 140, and a first sidewall 144 and a second sidewall 146 connecting the top wall 140 and the bottom wall 142. The top wall 140 includes an opening to allow a portion of the plunger 128 to move in and out of the casing 132. Further, the solenoid 116 includes a position ring 138 connected and adjacent to the second end 136 of the plunger 128. The spring 130 is disposed between the position ring 138 and the top wall 140 of the casing 132. In an embodiment, the spring 130 includes a first end 148 adjacent to the top wall 140 and a second end 150 connected to the plunger 128 and abutting against a bottom surface 152 of the position ring 138. The position ring 138 includes a protrusion 154 extending at a radial direction R toward the first sidewall 144. It should be appreciated that the solenoid 116 may have any appropriate configurations. For example, the solenoid 116 may be constructed in an open configuration or a closed configuration. In other embodiments, the solenoid 116 may be mounted internally or externally of the motor 102. In yet another embodiment, the solenoid 116 may be constructed as part of the motor housing 114 or a gear housing.

Referring to FIG. 5 and with further reference to FIGS. 3-4, the plunger sensor 118 is disposed to face the plunger 128. In some embodiments, the plunger sensor 118 may be attached to the first sidewall 144 of the casing 132. The first sidewall 144 may extend over the top wall 140 and its extended portion 156 faces the spring 130 and the position ring 138. In some embodiments, the plunger sensor 118 may be an inductive sensor. The plunger sensor 118 may include a probe 158 penetrating from the extended portion 156 and toward the plunger 128. In some embodiments, the plunger sensor 118 may be a hall effect sensor. The protrusion 154 of the position ring 138 may include a permanent magnet. The movement of the protrusion 154 relative to the probe 158 changes the magnetic field around the probe 158 and generates electric current for the determination of the position of the protrusion 154 and thus the position of the plunger 128. For example, at the extended state of the plunger 128, the electric circuit of the plunger sensor 118 has a first voltage corresponding to the position of the protrusion 154 adjacent to the probe 158. At the retracted state of the plunger 128, the electric circuit of the plunger sensor 118 has a second voltage corresponding to the position of the protrusion 154 away or offset from the probe 158. That is, the first voltage indicates that the plunger 128 is at the extended state and the second voltage indicates that the plunger 128 is at the retracted state. It should be appreciated that any appropriated sensor may be used to determine the position of the plunger 128. For example, the plunger sensor 118 may be any appropriate sensors including but not limited to a hall effect sensor, an IR sensor, etc.

FIG. 4 is a side view of the drive assembly 100, illustrating the plunger 128 of the solenoid 116 at the extracted state. At the extracted state, the plunger 128 disengages with the detent 120 and is spaced away from the detent 120 such that the motor shaft 104 is free to rotate. The solenoid 116 is configured to generate a magnetic force to move the plunger 128 down a predetermined distance toward a direction of the bottom of the casing 132 and hold the plunger 128 at the extracted state upon application of a voltage.

The incorporation of the solenoid 116 on the motor shaft 104 or the engagement of the plunger 128 of the solenoid 116 with the motor shaft 104 to lock the motor 102 is advantageous. For example, the solenoid 116 locking mechanism 106 is subject to less locking stress when the plunger 128 of the solenoid 116 engages with the motor shaft 104 directly compared to engaging the plunger 128 with an output shaft of the gear device 108. Further, less locking stress can lead to smaller and lighter locking components and provide more system reliability.

Figure 6:
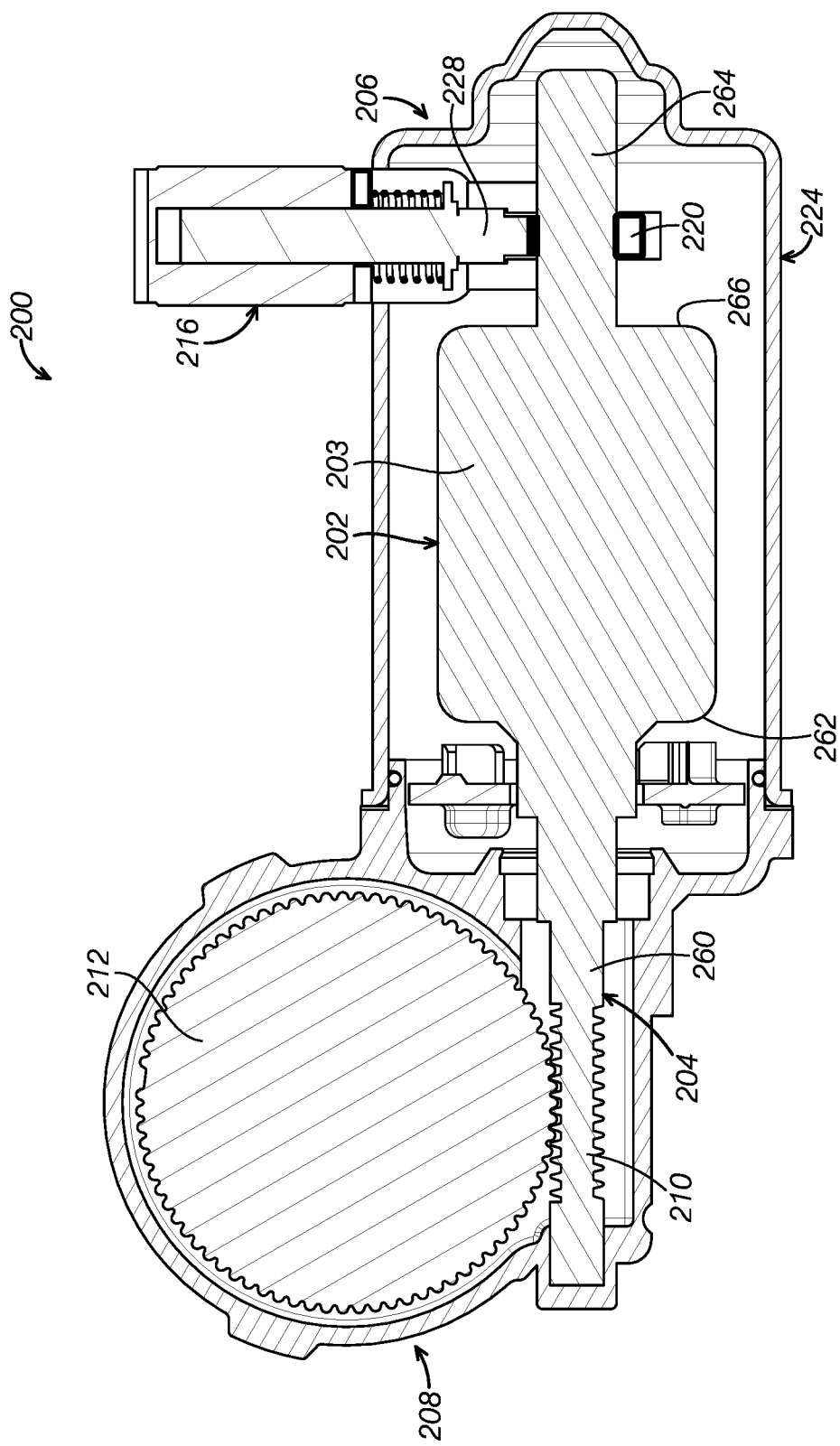
FIG. 6 illustrates a drive assembly according to another embodiment of the present disclosure.

FIG. 6 illustrates a drive assembly 200 according to another embodiment of the present disclosure. For the sake of brevity, in this example, the elements and features similar to those previously shown and described will not be described in much further detail. In other words, differences between the present embodiment and the embodiment of FIGS. 1A-5 will be mainly described. The drive assembly 200 includes a geared motor 202 having a motor shaft 204. The motor shaft 204 runs through a central bore of the rotor of the motor 202, and extends away from both sides of the rotor. The motor shaft 204 includes a first portion 260 extending from a first side 262 of the motor 202 and a second portion 264 extending from a second side 266 of the motor 202. The first side 262 is opposite to the second side 266. The difference of the drive assembly 200 from the drive assembly 100 is that a locking mechanism 206 is disposed adjacent to the second portion 264. The locking mechanism 206 may include a solenoid 216 having a plunger 228 and a detent 220 attached to the second portion 264 of the motor 202. In other words, a motor body 203 of the motor 202 is disposed between an engagement position E of a gear device 208 and the detent 220. In the depicted embodiment, the gear device 208 includes an output gear or a worm gear 212 and a worm screw 210 formed on the first portion 260 of the motor shaft 204. By positioning the locking mechanism 206 at one side of a housing 224 opposite the gear device 208, the drive assembly 200 provides packaging flexibility.

Figure 7:
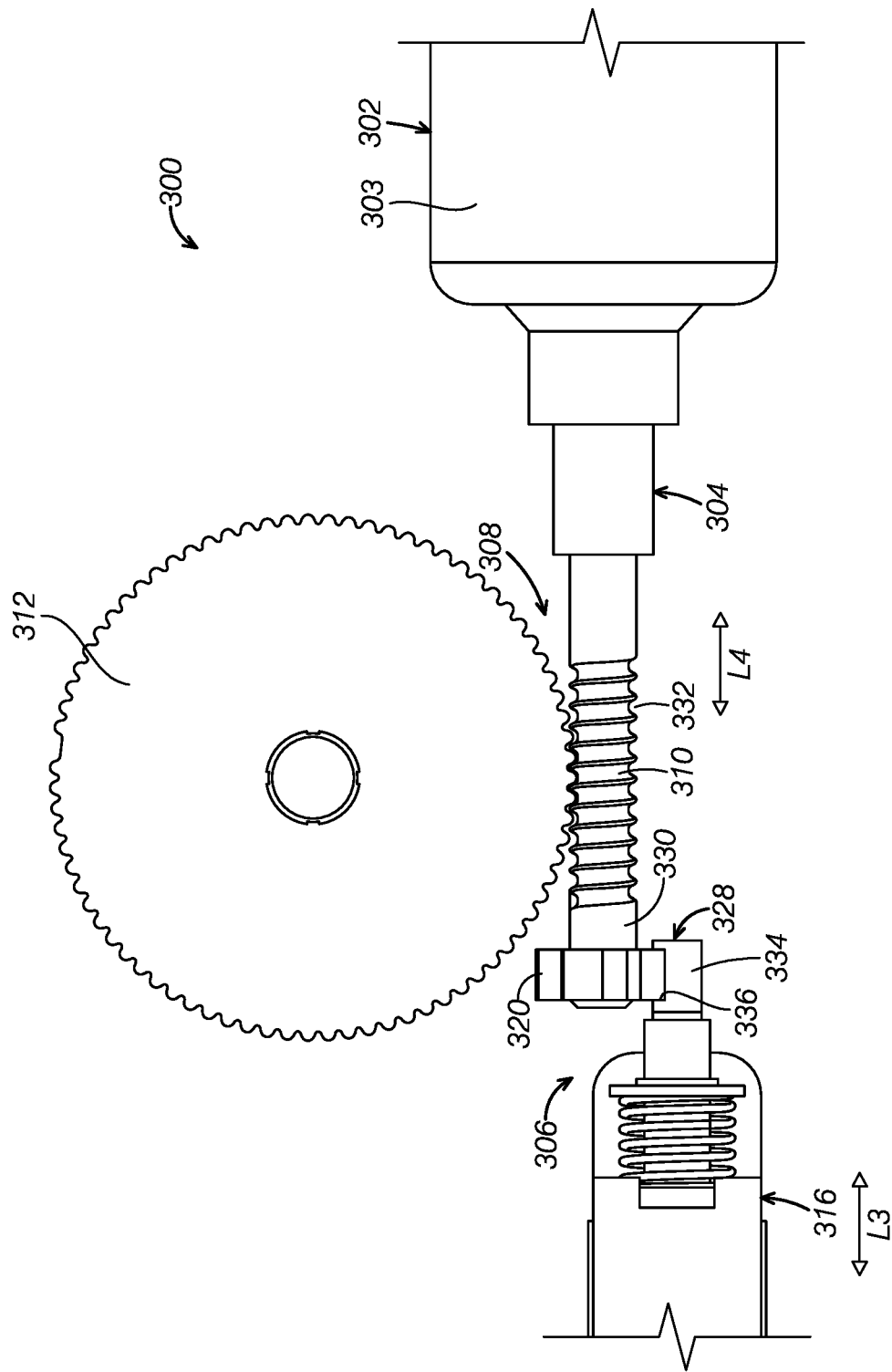
FIG. 7 illustrates a drive assembly according to yet another embodiment of the present disclosure, illustrating an embodiment in which a solenoid is mounted axially to a motor shaft.

FIG. 7 illustrates a drive assembly 300 according to yet another embodiment of the present disclosure. For the sake of brevity, in this example, the elements and features similar to those previously shown and described will not be described in much further detail. In other words, differences between the present embodiment and the embodiment of FIGS. 1A-5 will be mainly described. The drive assembly 300 includes a geared motor 302 having a motor shaft 304. In the depicted embodiment, the gear device 308 includes an output gear or a worm gear 312 and a worm screw 210 formed on the motor shaft 304. The motor shaft 304 has a free end 330 and the worm screws 310 is formed on a portion 332 adjacent to the free end 330. In other words, the worm screws 310 are positioned between the free end 330 and a motor body 303. The difference of the drive assembly 300 from the drive assembly 100 is that a locking mechanism 306 is disposed adjacent to the free end 330 of the motor shaft 304. The locking mechanism 306 may include a solenoid 316 having a plunger 328 and a detent 320 attached to the free end 330 of the motor shaft 304. A movement direction or a lengthwise direction L3 of the plunger 328 is parallel to a lengthwise direction L4 of the motor shaft 304. That is, the solenoid 316 is mounted at an axial direction of the motor shaft 304. A free end 334 of the plunger 328 may include a recess 336 facing toward the motor shaft 304. At an extended state of the plunger 328 as shown in FIG. 7, the recess 336 is positioned under the detent 320 and receives the detent 320 such that the movement of the motor shaft 304 is restricted or the motor shaft 304 is locked. By positioning the locking mechanism 306 at the free end 330 of the motor shaft 304 the drive assembly 200 provides flexibility on the packaging.

Figure 8:
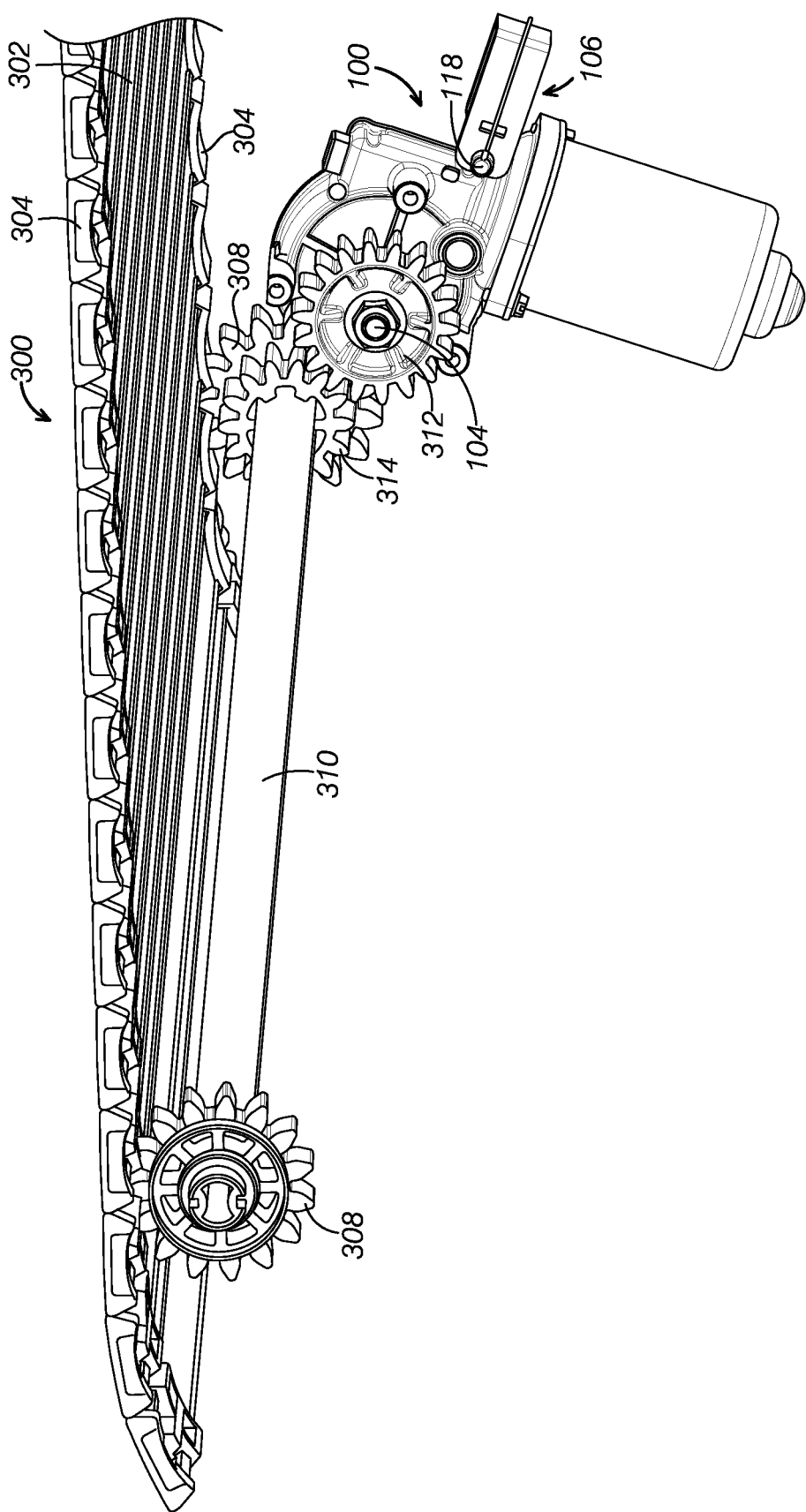
FIG. 8 is a partial perspective view of a powered cargo roller shutter assembly according to one embodiment of the present disclosure.
Figure 9:
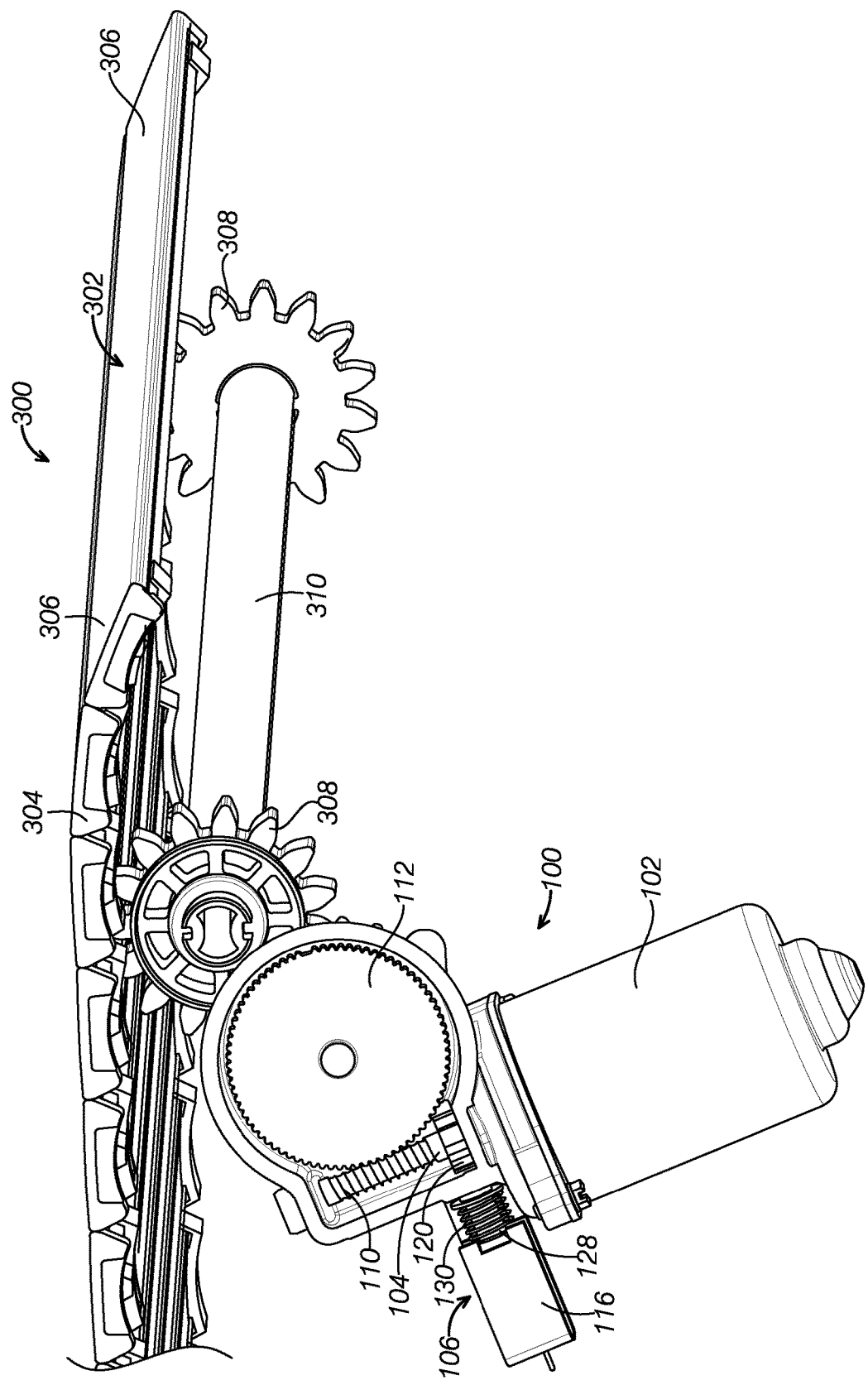
FIG. 9 is another perspective view of the powered cargo roller shutter assembly of FIG. 8.

The drive assembly of the present disclosure may have various applications. FIGS. 8-9 illustrate the drive assembly 100 for a powered cargo roller shutter assembly 300 in a vehicle. It should be appreciated that the drive assembly 200 and the drive assembly 300 may also be used for a powered cargo roller shutter assembly. The powered cargo roller shutter assembly 300 may be used in a truck and may include a cargo roller shutter 302 configured to move between an open position at which the cargo area of the truck is accessible and a fully closed position at which the cover closes the cargo area. It should be appreciated that the cargo roller shutter 302 may be located and locked at a half-closed position between the open position and the fully closed position in some conditions depending on the need of the user. In some embodiments, the cargo roller shutter 302 includes two tracks 304 on side edges 306. Two sprockets 308 are provided to engage with the two tracks 304, respectively and may be connected to a driving shaft 310. The sprockets 308 are driven by the motor drive assembly 100 to move the cargo roller shutter 302 between the open position and the closed position.

Continuing with FIGS. 8-9, the cargo roller shutter 302 is driven by the drive assembly 100. The drive assembly 100 includes a motor 102 having a motor shaft 104, an output gear 112, and a locking mechanism 106. In some embodiments, the output gear 112 may be a worm wheel engaged with the worm screws 110 formed on the motor shaft 104. In some embodiments, the drive assembly 100 may further include a plunger sensor 118. In some embodiments, the powered cargo roller shutter assembly 300 may include a driving gear 312 connected to the motor shaft 104. The driving gear 312 engages with a driven gear 314 that is connected to the driving shaft 310 and adjacent to one sprocket 308. When the motor shaft 104 rotates, the driving gear 312 rotates, which in turn transmit the force to the sprocket 308 to cause the movement of the shutter 302.

The powered cargo roller shutter assembly 300 may include the locking mechanism 106 to lock and unlock the movement of the cargo roller shutter 302. The locking mechanism 106 includes a detent 120 mounted on the motor shaft 104 and a solenoid 116 positioned adjacent to the detent 120. The detent 120 includes a plurality of teeth disposed around the circumference of the motor shaft 104. The solenoid 116 may be connected to a power supply such as a vehicle battery. The plunger 128 is biased by the spring 130 at an extended state and engages the detent 120 to lock the motor shaft 104 when there is no voltage applied to the electromagnetic coil 126. The spring 130 is configured to exert a predetermined force such that the motor shaft 104 is locked to resist an external force exerted on the roller shutter 302 once the plunger 128 is engaged with the detent 120. That is, the shutter 302 cannot be moved when the power is off the solenoid 116. In this way, the cargo roller shutter 302 can be prevented from an unintended opening by a reversal force at an unpowered condition. The solenoid 116 is further configured to move the plunger 128 away from the motor shaft 104 to allow free rotation of the motor shaft 104 when a voltage is applied to the solenoid 116.

Figure 10:
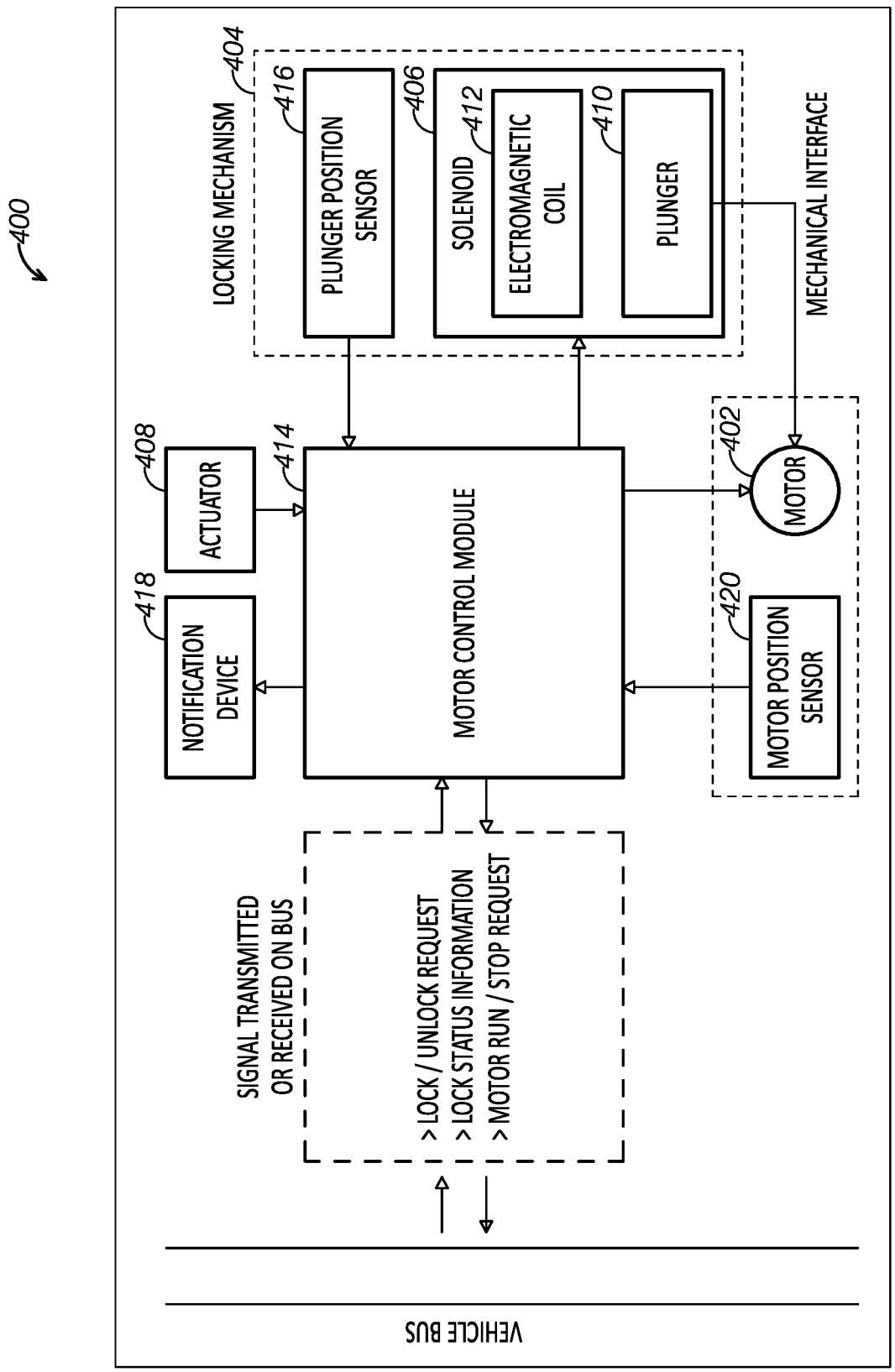
FIG. 10 is a block diagram of a drive assembly according to another embodiment of the present disclosure.

FIG. 10 is a block diagram of a drive assembly 400 according to one embodiment of the present disclosure. The drive assembly 400 may include a motor 402, a lock mechanism 404 including a solenoid 406 and a detent (not shown). The motor 402 may be any appropriate type of motors such as a geared motor, a non-geared motor, any type of DC motor, an AC motor, a brushed motor, a brushless motor, a synchronous motor, a stepper motor, a reluctance motor, and a hysteresis motor. The locking mechanism 106 may be used to lock any these types of motors which produce mechanical energy or rotation on application of electrical energy. The solenoid may include a plunger 410 and an electromagnetic coil 412. The locking mechanism 404 may further include a plunger sensor 416. The drive assembly 400 is connected to a power supply (not shown). The lock mechanism 404 may operate in a similar manner as the lock mechanism 106, 206 and 306 as described above. In some embodiments, the power supply applies and cuts off a voltage to the solenoid 406 to retract and extend the plunger 410, respectively, based on a user command. In some embodiments, the drive assembly 400 may include an actuator 408 and the user command is implemented via the actuator 408. The voltage is applied to the solenoid 406 to move the plunger 410 to a retracted state when the actuator 408 is at an "on" status such that the motor can rotate freely and the voltage is cut off to the solenoid to move the plunger 410 to an extended state to lock the motor when the actuator 408 is at an "off" status such that the motor shaft is locked. In some embodiments, the drive assembly 400 may be used for a powered cargo roller shutter in a truck. The actuator 408 may be a button positioned at a location on an instrument panel of the truck.

In some embodiments, the drive assembly 400 may further include a motor control module 414 and a plunger position sensor 416 positioned adjacent to the plunger 410 of the solenoid 406 and adapted to communicate with the motor control module 414. The motor control module 414 may include a processor that provides for computational resources and a memory. The motor control module 414 may serve to execute instructions for software that may be loaded into the memory. The motor control module 414 may be a separate control module or a control module integrated with a vehicle control module. The motor control module 414 may be configured to control timing of applying the voltage or removing the voltage to the solenoid 404. The motor control module 414 may further be configured to detect and control the operation of the motor 402. For example, the drive assembly 400 may further include a motor position sensor 420 configured to detect an operation of the motor 402. The motor control module 414 may be configured to communicate with the motor position sensor 420 and control the solenoid 406 accordingly. For example, when the motor control module 414 receives a signal from the motor position sensor 420 that the motor is running, the motor control module 414 will not command cutting off the voltage to the solenoid 406 to move the plunger 410 to lock the motor shaft even if the actuator is at the "off" position or a user commands the locking of the motor 402. That is, the plunger 410 is controlled to move to the extended position only when the motor 402 fully stops operation and the actuator is at the "off" position. In this way, the damage or the wearing of the parts of the motor 402 and the lock mechanism 404 can be avoided. It should be appreciated that the actuator 408 may be a button on a user interface on a human machine device in the vehicle, a smart phone, or a vehicle key fob which communicates with the motor control module.

In some embodiments, the drive assembly system 400 may further comprise a notification device 418 that notifies the user of the status of the locking mechanism 404. In some embodiments, the drive assembly 400 is used for the powered cargo roller shutter. The notification device 418 is configured to communicate with the motor control module 414 and alerts a user to an unlocked status when the plunger sensor 416 detects that the plunger 410 is at the retracted state while the cargo roller shutter is at the fully closed position. The notification device 418 may issue an alert in a text, a sound, or light. For example, the notification device 418 may be a display screen positioned adjacent to the actuator 408, or a human machine interaction device on an instrument panel of the vehicle or a smart phone and a message that "the roller shutter is not locked" may be displayed on a display screen of the instrument panel of the vehicle, or a smart phone. In another example, the notification device 418 may be an audio device or a light illumination device incorporated in a vehicle key to alert the unlocking status of the roller shutter via a voice message, a sound, or light.

In some embodiments, the motor control module 414 may communicate with a vehicle bus directly to receive and send various information related to the operation of the drive assembly such as lock/unlock request, lock status information, and motor run/motor stop request.

The locking mechanism of the present disclosure locks the motor shaft positively via a solenoid when the power is cut off from the solenoid. When the drive assembly is used for a powered cargo roller shutter, such positive lock prevents an unintended opening of the roller shutter via application of an external force to the roller shutter. Further, the efficiency of the drive assembly is not compromised. For example, self-locking of a gear device having a worm wheel and worm screw can be achieved by a small lead angle $\lambda$. However, the worm gear efficiency is lower when the worm gear has a small lead angle for the self-locking. The lead angle $\lambda$ of the gear device of the present disclosure can be configured to be greater because self-locking is not required. Referring to FIG. 1B, the lead angle $\lambda$ is the angle between the helix and a plane of rotation. By using the positive locking via a locking mechanism, the lead angle $\lambda$ can be configured to be equal or greater than a minimum angle that can self lock the motor. In one example, the lead angle $\lambda$ can be greater than 6 degrees. In another example, the lead angle $\lambda$ can be greater than 7 degrees. In yet another example, the lead angle $\lambda$ can be greater than 8 degrees. In another example, the lead angle $\lambda$ can be greater than 9 degrees.

The drive assemblies of the present disclosure can achieve desired locking without compromising the efficiency of the motor. In one example embodiment, the drive assembly is used for a powered cargo roller shutter of a truck. The positive locking can prevent unintended forced break-ins with no additional latch/lock required to secure the cargo roller shutter. Further, the drive assembly without self-locking is quieter in operation.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

What is claimed is:

1. A drive assembly, comprising:
    a motor including a motor shaft;
    a detent provided on the motor shaft;
    a solenoid including an electromagnetic coil, a plunger, a spring that holds the plunger at an extended state, and a position ring connected to the plunger,
    wherein the plunger engages the detent in the extended state and is disengaged from the detent in a retracted state; and
    a plunger sensor mounted to the solenoid and configured to detect a state of the plunger based on a positioning of the position ring,
    wherein the plunger sensor is an inductive sensor mounted to a sidewall of a casing of the solenoid.

2. The drive assembly of claim 1, wherein the plunger is biased by the spring to the extended state and engages the detent to lock the motor shaft when there is no voltage applied to the solenoid, wherein the spring is configured to exert a predetermined force for the plunger to engage the detent such that the motor shaft is locked and not moveable under an external force.

3. The drive assembly of claim 2, wherein the plunger retracts away from the detent to the retracted state such that the motor shaft is moveable when a voltage is applied to the solenoid.

4. The drive assembly of claim 1, wherein the motor is a geared motor and includes a worm screw that is formed on the motor shaft, wherein the worm screw is configured to engage a worm wheel.

5. The drive assembly of claim 1, wherein the motor is a non-geared motor.

6. The drive assembly of claim 1, wherein the detent is mounted on the motor shaft adjacent to an engagement position of the motor shaft with an output gear, and the detent is positioned between a motor body of the motor and the engagement position, and wherein a moving direction of the plunger is substantially perpendicular to a lengthwise direction of the motor shaft.

7. The drive assembly of claim 1, wherein the motor shaft includes a first portion extending from a first side of the motor and a second portion extending from a second side of the motor opposite the first side, and the detent is mounted to the second portion of the motor shaft, and a motor body is disposed between an engagement position of the motor shaft with an output gear and the detent, and wherein a moving direction of the plunger is substantially perpendicular to a lengthwise direction of the motor shaft.

8. The drive assembly of claim 1, wherein the detent is mounted on a free end of the motor shaft, and the free end has a recess configured to receive the detent when the plunger is in the extended state, and wherein a moving direction of the plunger is substantially parallel to a lengthwise direction of the motor shaft.

9. The drive assembly of claim 1, wherein the detent includes a plurality of teeth, and the plunger engages a space between two of the plurality of teeth when no voltage is applied to the solenoid.

10. The drive assembly of claim 1, comprising:
    a motor position sensor to detect an operation status of the motor; and a motor control module,
wherein the motor control module is configured to command the plunger to move to the extended state upon a user command and a signal from the motor position sensor that the motor has stopped running.

11. The drive assembly of claim 10, wherein the motor control module is configured to send a signal to a notification device when the plunger sensor detects that the plunger is in the retracted state.

12. The drive assembly of claim 1, wherein the position ring includes a protrusion, and the plunger sensor is configured to detect a position of the protrusion relative to the plunger sensor and then output a detected position of the plunger to a motor control module.

13. The drive assembly of claim 1, wherein the drive assembly is part of a vehicle powered cargo roller shutter.

* * * * *